T. H. GRIGG.
VEHICLE TIRE.
APPLICATION FILED NOV. 13, 1911.
1,069,941.
Patented Aug. 12, 1913.
2 SHEETS—SHEET 2.
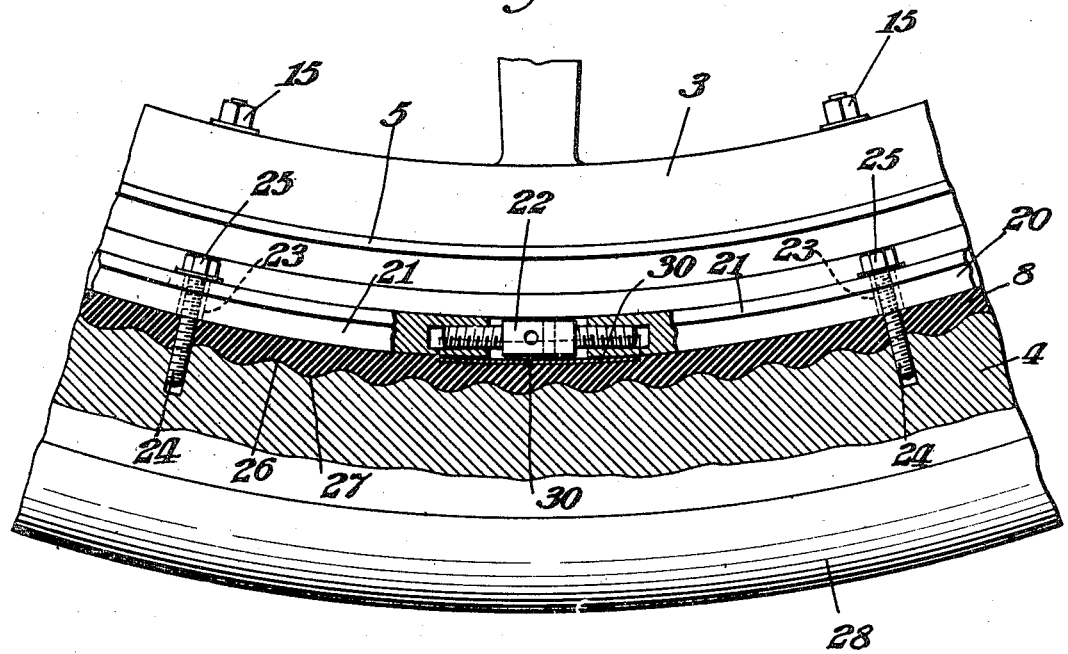
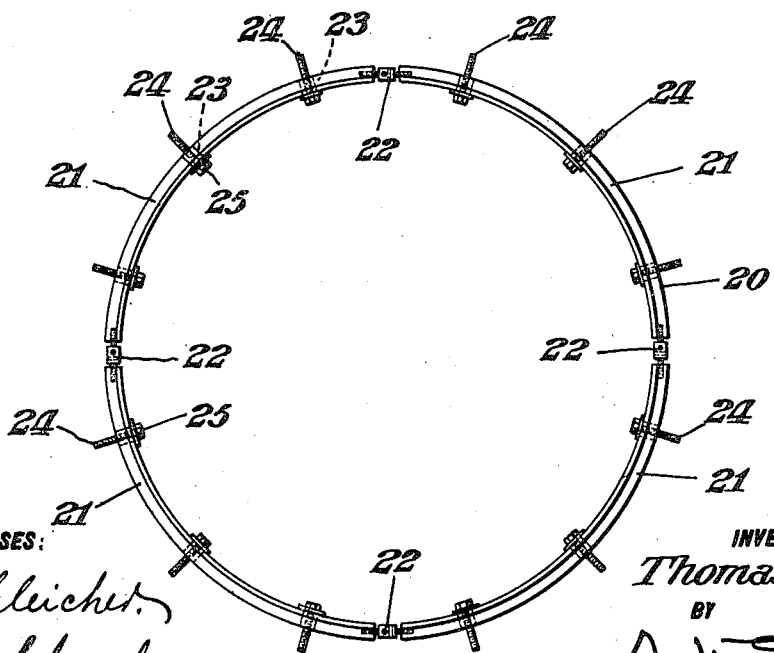
WITNESSES:
R. Schleicher
G. P. Sharkey
INVENTOR
Thomas H. Grigg
BY
A. V. Groupe
ATTORNEY.

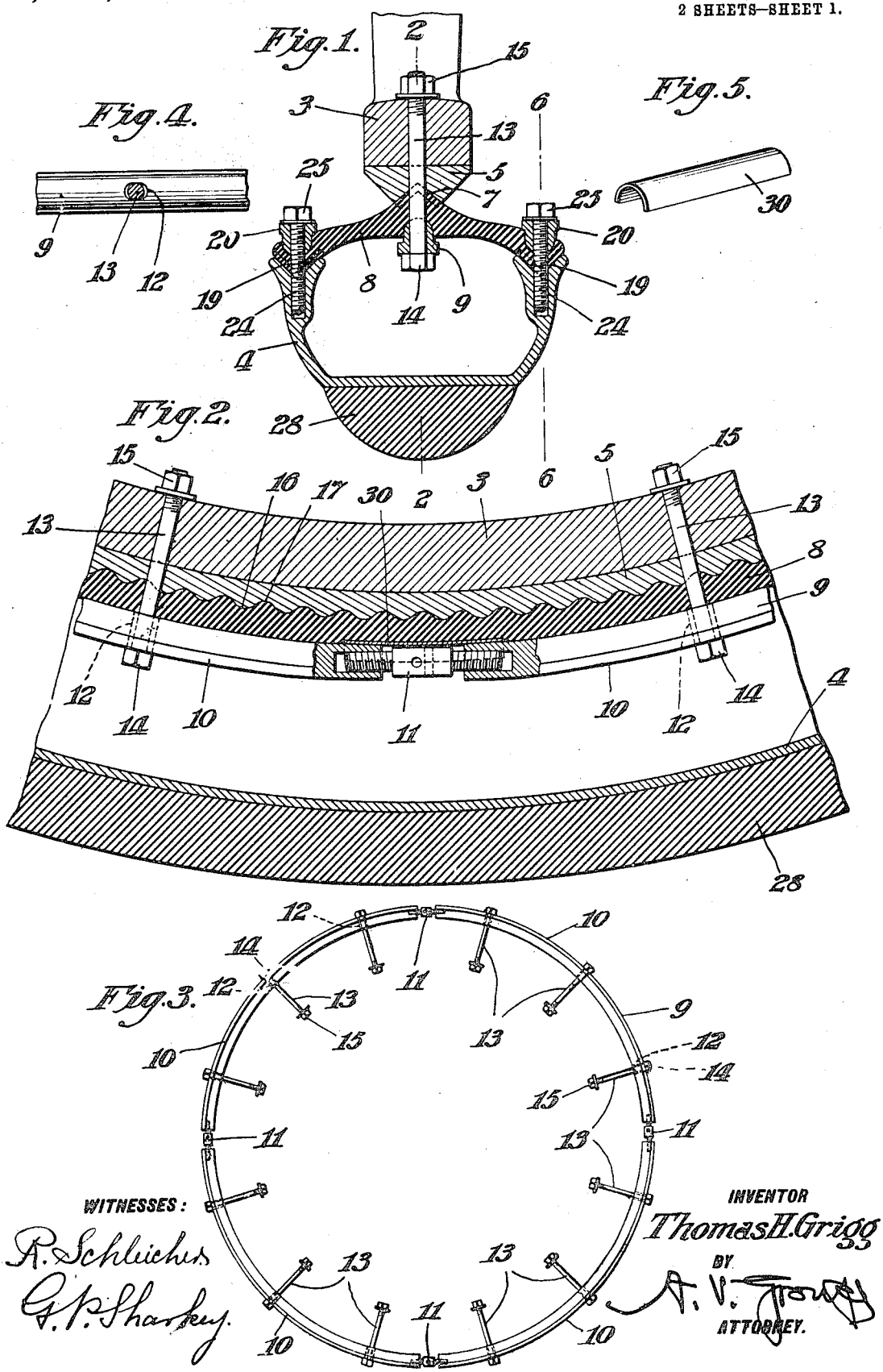

UNITED STATES PATENT OFFICE.

THOMAS H. GRIGG, OF PHILADELPHIA, PENNSYLVANIA, ASSIGNOR TO SUSPENSION TIRE COMPANY, OF WILMINGTON, DELAWARE, A CORPORATION OF DELAWARE.

VEHICLE-TIRE.

1,069,941. Specification of Letters Patent. Patented Aug. 12, 1913.

Application filed November 13, 1911. Serial No. 659,979.

*To all whom it may concern:*

Be it known that I, THOMAS H. GRIGG, a citizen of the United States, residing at Philadelphia, in the county of Philadelphia and State of Pennsylvania, have invented certain new and useful Improvements in Vehicle-Tires, of which the following is a specification.

This invention relates to vehicle tires of the general character disclosed in my previous Patent No. 597,164, dated January 11, 1898, to which reference may be had.

In vehicle tires of this general character, two relatively movable parts, one forming the felly and the other forming a rigid tire are connected by an elastic band or diaphragm which is clamped to one of said parts by an expansible and contractible clamping ring. Great difficulty has been experienced in holding the band or diaphragm to one of the said parts by the clamping ring owing to the great and various strains to which the parts are subjected when in use, the clamping ring being frequently dislodged from its clamping position and the band or diaphragm being forced from its clamped position.

The object of my present invention is to provide a clamping ring of novel construction and securing devices coöperating with the clamping ring and the part to which it is securing the elastic band whereby the clamping ring and the band engaged thereby may be securely held in the clamping position without liability of being displaced therefrom.

With this object in view the invention consists in the novel construction and combinations of parts hereinafter fully described and claimed.

In the accompanying drawings, illustrating my invention: Figure 1, is a transverse section through a portion of a vehicle tire embodying my invention. Fig. 2, is a longitudinal section, on line 2—2 of Fig. 1. Fig. 3, is a side view of the ring for clamping the elastic band to the felly. Fig. 4, is a bottom view of a portion of the clamping ring, showing one of the clamping bolts in section. Fig. 5, is a perspective view of one of the clamping ring guards. Fig. 6, is a longitudinal section, on line 6—6 of Fig. 1. Fig. 7, is a side view of the ring for clamping the elastic band to the rigid tire.

3 designates an annular felly and 4 an annular tire.

The felly 3 is preferably formed of wood and is provided with a metal rim 5 surrounding the same and secured thereto. The tire 4 is substantially U-shaped in cross section and is preferably formed of metal to provide a rigid tire which is bodily movable toward and from the felly. The rim 5 of the felly 3 is provided with a peripheral groove 7 therein in which is seated the central portion of an elastic band or ring 8 which is preferably formed of rubber and which extends around and closes the inner or open side of the rigid tire 4.

The central portion of the band or ring 8 is clamped within the groove 7 by an expansible and contractible clamping ring 8 comprising four separate sections 10 and turn-buckles 11 connecting the ends of the sections 10 together, as shown in Fig. 3. The ends of the turn buckles are oppositely screw-threaded and screwed into the ends of the sections 10, whereby by turning the turn-buckles in one direction the entire clamping ring 9 may be expanded, and by turning the turn-buckles in the reverse direction the entire clamping ring 9 may be contracted. The central portions of the turn-buckles are provided with suitable openings, as shown, for the insertion of a suitable tool to operate the turn-buckles in expanding and contracting the ring.

The clamping members 9 are provided with slots 12 into and through which radially-arranged bolts 13 extend, the outer ends of the bolts 11 being provided with heads 14 which engage the outer faces of the sections 10 The bolts 11 extend inwardly from the sections 10 through radial openings in the elastic band 8, the rim 5 and the felly 3. The inner ends of the bolts 13 extend beyond the inner face of the felly 3 and are screw-threaded for the reception of nuts 15 which are screwed onto the bolts 13 and against the inner face of the felly 3 in a manner to draw the sections 10 toward the rim 6 and firmly hold the clamping ring 9 in position clamping the central portion of the elastic band 8 between the rim 6 and ring 9 and within the groove 7.

The walls of the groove 7 are provided with transversely-extending raised portions 16 and depressed portions 17 which alternate with each other, as shown. When the central portion of the elastic band 8 is forced into the groove by the clamping ring 9, portions of the elastic band 8 are forced into the depressed portions 17 of the ring 6 of the felly 3, thereby causing the alternating raised and depressed portions 16 and 17 to prevent the creeping of the band 8 circularly about the felly 3. The creeping of the band 8 circularly about the felly 3 may be further prevented by the bolts engaging the ends of the slots 12. The lateral edge portions of the elastic band 8 are seated within grooves 19 formed in the side walls of the rigid tire 4, as shown; and the lateral edge portions of the band 8 are clamped within the grooves 19 by expansible and contractible clamping rings 20, one for each edge of the band 8. Each ring 20 comprises four separate sections 21 and turn-buckles 22 connecting the ends of the sections 21 together, as shown in Fig. 7. The ends of the turn-buckles 22 are oppositely screw-threaded and screwed into the ends of the sections 20, whereby by turning the turn-buckles 22 in one direction the entire clamping ring 20 may be expanded, and by turning the turn-buckles in the reversed direction the entire clamping ring 20 may be contracted. The central portions of the turn-buckles 22 are also provided with suitable openings, as shown, for the insertion of a suitable tool to operate the turn buckles in expanding and contracting the ring 20.

The clamping members are provided with slots 23 into and through which radially-arranged bolts 24 extend, the inner ends of the bolts 24 being provided with heads 25 which engage the inner faces of the sections 21. The bolts 24 extend outwardly from the sections 21 through radial openings in the elastic band 8; and the outer ends of the bolts 24 are screw-threaded and screwed into the side walls of the rigid tire 4 in a manner to draw the sections 21 toward the rigid tire 4 and firmly hold the clamping rings 20 in position clamping the edge portions of the elastic band 8 within the grooves 19.

The walls of the grooves 19 are provided with transversely-extending raised portions 26 and depressed portions 27 which alternate with each other, as shown. When the edge portions of the elastic band 8 are forced into the grooves 19 by the clamping rings 20, portions of the band 8 are forced into the depressed portions 27 of the rigid tire 4, thereby causing the alternating raised and depressed portions 26 and 27 to prevent the creeping of the band 8 circularly about the tire 4. The creeping of the edge portions of the band 8 circularly about the tire 4 may be further prevented by the bolts 24 engaging the ends of the slots 23. The rigid tire 4 is preferably provided with a tread portion or shoe 28 of rubber or other suitable material which may be secured to the tire 4 in any suitable manner.

In assembling the parts, the central portion of the elastic band 8 is first connected to the felly 3, and the edge portions of the band 8 are then connected to the rigid tire 4. In connecting the band 8 to the felly 3, the central portion of the band is first seated within the groove 7 with the bolt holes in the central portion of the band 8 in registry with the bolt holes in the felly 3 and its rim 5. The clamping ring 9, having been first expanded by operating the turn-buckles 11, is then placed around the central portion of the band 8 with the central slot 12 in each section 10 in registry with a bolt hole in the band 8. A bolt 13 is then extended through the central slot 12 in each member 10 and through the corresponding bolt holes in the band 8, the rim 5 and the felly 3, and a nut 15 is applied to the inner end of each inserted bolt. In this condition of the parts the end slots of each section 10 are out of registry with the corresponding bolt holes in the band and felly. The turn-buckles 11 are now operated to contract the ring 9 and clamp the central portion of the band 8 within the groove 7, and at the same time bring the end slots 12 of each section 10 into registry with the corresponding bolt holes in the band and felly. The remaining bolts 13 are now extended through the end slots 12 and corresponding holes in the band and felly and the nuts 15 are applied to the inner ends of the bolts 13. The slots 12 permit the entire clamping ring 9 to be adjusted within limits with respect to the securing bolts 13, and thereby permit the turn-buckles 11 and the nuts 15 to be alternately tightened during the final clamping operation. In connecting the edges of the band 8 to the felly 3, the edge portions of the band are first seated within the grooves 19 with the bolt holes in the edge portions of the band 8 in registry with the bolt holes in the side walls of the tire 4. The clamping rings 20 having been first contracted by operating the turn-buckles 22, are then placed around the insides of the edge portions of the band 8 with the central slot 23 in each section 21 in registry with a bolt hole in the band 8. A bolt 24 is then extended through the central slot 23 in each member 21 and through the corresponding bolt holes in the band 8, and screwed into the tire 4. In this condition of the parts, the end slots of each section 21 are out of registry with the corresponding bolt holes in the band and tire. The turn-buckles 22 are now operated to expand the rings 20 and clamp the edge portions of the band 8 within the grooves 19, and at the same time bring the end slots 23 of each section 21 into registry with the corresponding bolt holes in the band and tire. The remaining bolts 24 are now extended through the end slots 23 and corresponding holes in the band and are screwed into the side walls of the tire 4. The slots 23 permit each entire clamping ring 20 to be adjusted within limits with respect to the securing bolts 24, and thereby permit the turn-buckles 22 and the bolts 24 to be alternately tightened during the final clamping operation of the edges of the band 8. In order to prevent the elastic band 8 from interfering with the turn-buckles 11 and 22 by bulging into the spaces between the sections of the clamping rings 9 and 20, respectively, I provide suitable guards 30 which extend across the spaces between the ends of the sections of the clamping rings and which engage the ends of said sections and the elastic band, as shown.

I claim:

1. The combination of two relatively movable parts, one forming a felly and the other forming a rigid tire, an elastic member connecting said parts, means for securing said member to one of said parts, a clamping ring securing said member to the other of said parts and provided with means operative to expand and contact the ring and place the same under tension when in clamping position, and securing bolts having heads engaged with said ring and extending from said heads through slots in said ring and engaging the part to which the ring is clamping the member.

2. The combination of two relatively movable parts, one forming a felly and the other forming a rigid tire, an elastic member connecting said parts, means for securing said member to one of said parts, a clamping ring securing said member to the other of said parts, said ring being formed of a plurality of separate sections having their ends connected by turn-buckles provided with oppositely screw-threaded ends engaged with the ends of the sections and operative to adjust the ends of the sections toward and from each other, and securing bolts having heads engaged with said ring and extending from said heads through slots in said ring and engaging the part to which the ring is clamping the member.

In testimony whereof I affix my signature in presence of two witnesses.

THOMAS H. GRIGG.

Witnesses:
WM. HARRISON SMITH,
A. V. GROUPE.